(No Model.)
J. A. CRABB.
CHECK HOOK.
No. 417,707. Patented Dec. 24, 1889.
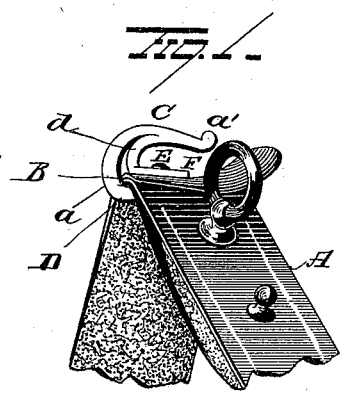
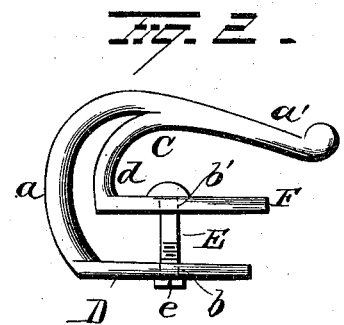
Witnesses
E. J. Nottingham
Sam Marks
Inventor
John A. Crabb.
By his Attorney
H. A. Seymour.

UNITED STATES PATENT OFFICE.

JOHN ALBERT CRABB, OF EMINENCE, KENTUCKY.

CHECK-HOOK.

SPECIFICATION forming part of Letters Patent No. 417,707, dated December 24, 1889.

Application filed September 6, 1889. Serial No. 323,129. (No model.)

*To all whom it may concern:*

Be it known that I, JOHN ALBERT CRABB, a citizen of Eminence, in the county of Henry and State of Kentucky, have invented certain new and useful Improvements in Check-Hooks; and I do hereby declare the following to be a full, clear, and exact description of the invention, such as will enable others skilled in the art to which it appertains to make and use the same.

My invention relates to an improvement in hooks for use on harness, and more particularly to hooks adapted to hold the checkrein; and it consists in certain novel features of construction and combinations and arrangements of parts, as hereinafter set forth, and pointed out in the claim.

In the accompanying drawings, Figure is a perspective view of a harness-saddle, showing my improved hook applied thereto. Fig. 2 is a separate view of the hook.

A represents a harness-saddle of any approved construction, and B the apex thereof, to which latter the hook C is secured, as shown in Fig. 1.

The hook C is made of a single piece of metal having its free end $a'$ extending rearwardly over a portion of the saddle. The outer curved portion or arm $a$ of the hook terminates in a flat horizontal shank D, having a perforation $b$ for the accommodation of a bolt E. At the point $c$, where the curved portion $a$ begins, a segmental arm $d$ extends downwardly in the arc of a circle and terminates in an integral horizontal shank F, having a perforation $b'$ in line with the perforation $b$ of shank D. It will be seen by reference to Fig. 2 that the shanks D F are substantially parallel throughout their length, the space between them being sufficient to accommodate the apex of the saddle-tree.

The hook, being constructed as above described, is placed on the saddle-tree, as shown in Fig. 1, the shank D being inserted beneath and the shank F resting on top. The headed bolt E is now passed through the saddle-tree and the aligned perforations in the shanks D and F and secured by a nut $e$, screwed upon its end.

With the hook thus constructed and applied to the saddle the segmental arm $d$, shank F, and the free end $a'$ of the device form the hook proper, and it will be readily seen that the rein draws directly on this inner hook or hook proper, the strain being directly at the base and against the bolt E.

The device may be made of any suitable metal and of any desired ornamental design without departing from the spirit of my invention; hence I do not wish to limit myself to any particular ornamentation; but, Having fully described my invention, what I claim as new, and desire to secure by Letters Patent, is—

A check-hook bifurcated near its front end, one member of the bifurcated section extending downwardly in curved form and terminating in a flat shank, and the other member extending downwardly below said shank and terminating in a shank, the said shanks being parallel for the reception between them of the saddle-tree, substantially as set forth.

In testimony whereof I have signed this specification in the presence of two subscribing witnesses.

JOHN ALBERT CRABB.

Witnesses:
C. S. THOMAS,
LOUIS B. HELBURN.